United States Patent [19]

Meyer

[11] Patent Number: 4,827,588
[45] Date of Patent: May 9, 1989

[54] METHOD OF MAKING A TURBINE NOZZLE

[75] Inventor: Robert H. Meyer, West Bloomfield, Mich.

[73] Assignee: Williams International Corporation, Walled Lake, Mich.

[21] Appl. No.: 140,751

[22] Filed: Jan. 4, 1988

[51] Int. Cl.⁴ .............................................. B21K 3/04
[52] U.S. Cl. .................................. 29/156.8 R; 29/463; 29/527.2
[58] Field of Search ............... 29/156.8 R, 156.8 B, 29/156.8 H, 156.8 T, 157 C, 455 R, 463, 527.2, 527.3; 164/34, 35, 36, 137

[56] References Cited

U.S. PATENT DOCUMENTS

| | | | |
|---|---|---|---|
| 1,390,835 | 9/1921 | Steenstrump | 29/156.8 R |
| 1,713,173 | 5/1929 | Dickinson | 29/156.8 R |
| 3,038,699 | 6/1962 | Kaplan | 29/156.8 R |
| 3,848,654 | 11/1974 | Boyle et al. | 164/137 |
| 4,066,116 | 1/1978 | Blazek et al. | 164/137 |
| 4,224,976 | 9/1980 | Blazek | 164/137 |
| 4,488,920 | 12/1984 | Danis | 156/155 |
| 4,499,940 | 2/1985 | Hall | 164/36 |
| 4,509,238 | 4/1985 | Lee et al. | 29/156.8 R |
| 4,607,680 | 8/1986 | Mills et al. | 164/137 |
| 4,728,258 | 3/1988 | Blazek et al. | 164/361 |

Primary Examiner—P. W. Echols
Assistant Examiner—Irene Cuda
Attorney, Agent, or Firm—Lyman R. Lyon

[57] ABSTRACT

A method of making a turbine nozzle comprises the steps of forming a destructible mold in the configuration of a fluid passage through said nozzle, coating the mold with a succession of layers of different materials, removing the mold so as to form a hollow vane segment, assembling a plurality of hollow vane segments in a circumferential array, and bonding the vane segments to one another to form the nozzle.

4 Claims, 2 Drawing Sheets

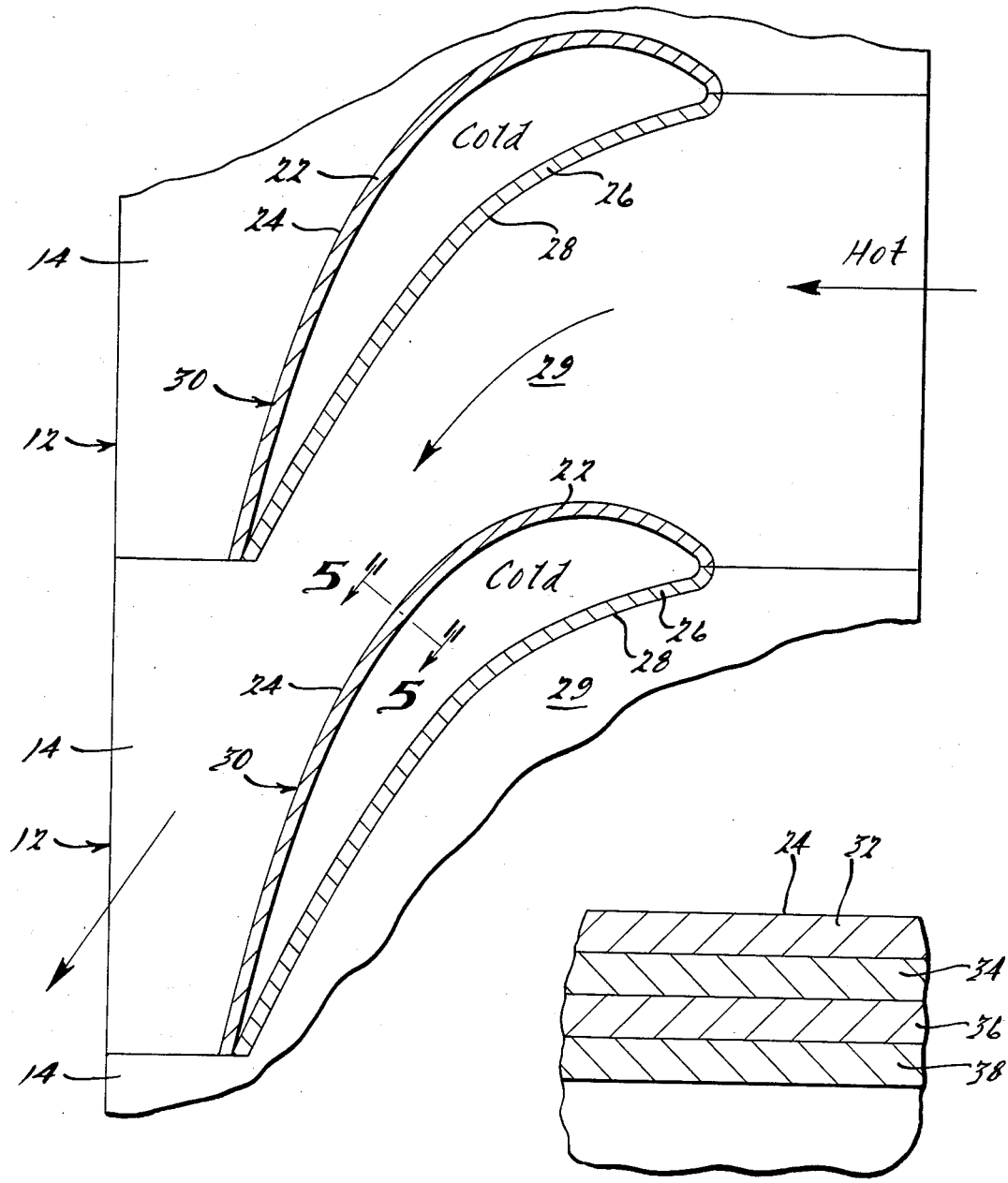

METHOD OF MAKING A TURBINE NOZZLE

BACKGROUND OF THE INVENTION

Turbine nozzles characteristically have a relatively complicated geometry which makes the application of protective and thermal barrier coatings extremely difficult. Specific problems are encountered in the coating of internal radii and the coating of surfaces that shadow each other.

SUMMARY OF THE INVENTION

The present invention solves the aforesaid problem by dividing the nozzle into individual circumferentially nested vane segments that are divided along a chord line of each vane. Protective and thermal barrier layers are applied to a destructible form in "reverse order" to build up each vane segment.

The process begins with the fabrication of a form representative of the gas passage between the vanes of the nozzle. Coatings are applied to the exterior surfaces of the form. Because all surfaces are "exterior," close tolerances and a good finish can be achieved on the first to be applied hot gas surface. Successive coatings build toward the interior and therefore less critical cold side of the vane segment.

Several materials are layered for high temperature applications starting with, for example, a zirconia thermal barrier coating, then an oxidation barrier, then a high temperature, low expansion metal—such as, molybdenum or hafnium, and finally another oxidation barrier. The form is thereafter destroyed as by melting. Thus, the layered coatings form the finished vane segment.

The layers of material are preferably applied by a conventional detonation gun controlled by a programmable controller. The controller moves the gun through a series of positions, and controls and mixes powders as scheduled in the controller program. Preferably, selected graduation of materials in the interfaced layers helps form a strong, tightly bonded vane segment. For less stringent operating conditions, other coating techniques could be applied, and materials such as zirconia, NiCrAlY and nickel alloy can be utilized.

BRIEF DESCRIPTION OF THE DRAWINGS

FIG. 4 is a cross sectional view taken along the line 4—4 of FIG. 1.

FIG. 5 is a fragmentary cross sectional view taken along the line 5—5 of FIG. 4.

DETAILED DESCRIPTION OF THE PREFERRED EMBODIMENT OF THE INVENTION

Figure 1:
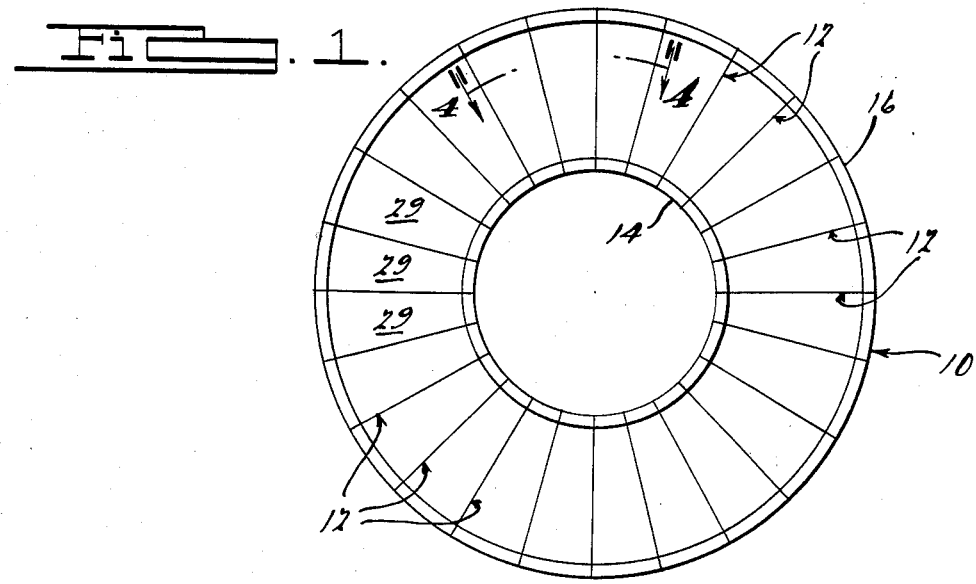
FIG. 1 is a front view, looking axially, of a complete turbine nozzle fabricated in accordance with the invention.
Figure 2:
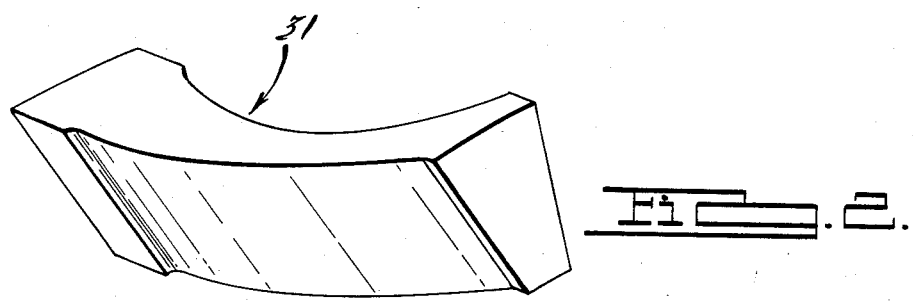
FIG. 2 is a perspective view of a vane segment form.
Figure 3:
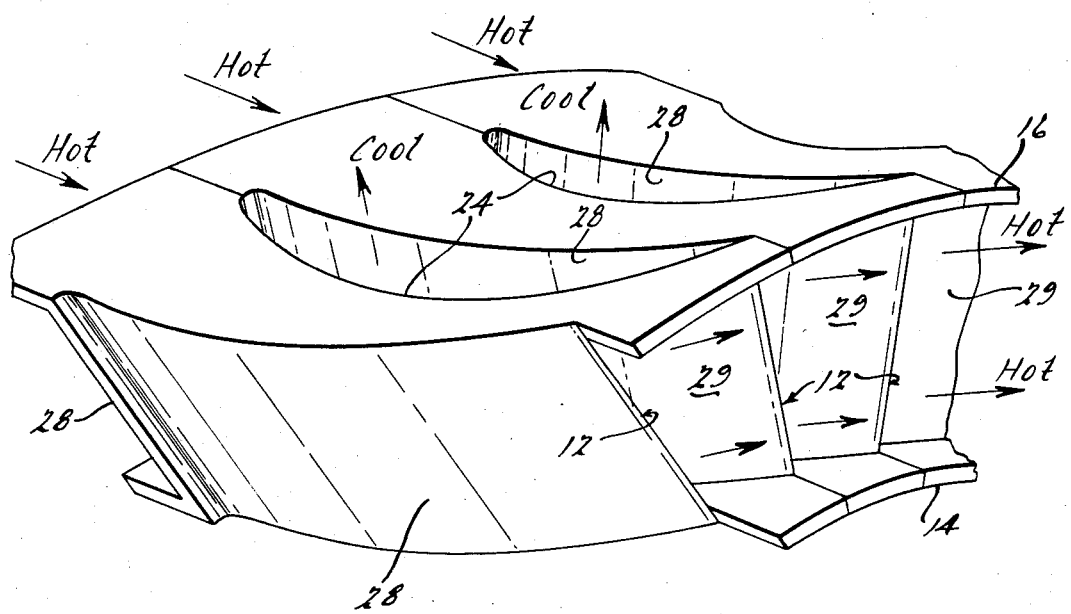
FIG. 3 is a perspective view of several vane segments after removal of the form and assembly with one another.

As best seen in FIG. 1 a turbine nozzle 10, in accordance with the present invention, comprises a plurality of individual vane segments 12 that are circumferentially nested along the chord line of each vane defined by adjacent pairs of vane segments 12. Each vane segment 12 comprises a radially inner and a radially outer wall portion 14 and 16, respectively, which when assembled define continuous cylinders.

As best seen in FIG. 4, each vane segment 12 comprises a radially extending suction side wall 22 having a convex surface 24 and a radially extending pressure side wall 26 having a concave surface 28. The walls 22 and 26 define opposite walls of a hot gas passage 29. Thus, each vane segment 12 comprises a four sided box section which, when joined to an adjacent vane segment 12, defines a hollow vane 30 through which cooling air flows radially.

In accordance with the present invention, each vane segment 12 is fabricated by coating a form 31, which is representative of the gas passage 29, with a plurality of coatings in a sequence dictated by the environment in which the nozzle 10 is to operate. The coatings are applied, after suitable masking, to the exterior surfaces of the form 31. Therefore, because all surfaces are "exterior," close tolerances and a good finish can be achieved on the hot gas surfaces which are the first surface to be applied to the form 31. Successive coatings build toward the less critical relatively cold interior of each vane 30.

As seen in FIG. 5, a typical high temperature application comprises a zirconia thermal barrier coating 32 which is applied first, then an oxidation barrier 34, then a high temperature, low expansion metal layer 36 such as molybdenum or hafnium, and finally another oxidation barrier layer 38. The form 31 is thereafter removed as by melting or using other conventional lost mold techniques.

The layers of material are preferably applied by a conventional detonation gun (not shown) controlled by a conventional programmable controller. The controller mixes powders as scheduled in the controller program. The selected graduation of materials in the interfaced layers helps form a strong, tightly bonded vane segment 12.

After coating the form 31 with the desired layers and removal of the form 31, as by melting, the vane segments 12 are bonded to one another as by conventional diffusion bonding to form the turbine nozzle 10.

While the preferred embodiment of the invention has been disclosed, it should be appreciated that the invention is susceptible of modification without departing from the scope of the following claims

I claim:

1. A method of making a turbine nozzle comprising the steps of
   - forming a destructible mold in the configuration of a fluid passage through said nozzle having a suction wall and a pressure wall,
   - coating said mold with a succession of layers of different materials,
   - removing said mold so as to form a hollow vane segment,
   - assembling a plurality of said hollow vane segments in a circumferential array; and,
   - bonding said vane segments to one another to form said nozzle.

2. The method of claim 1 comprising the step of bonding a suction wall of one of said vane segments to a pressure wall of an adjacent vane segment so as to define a hollow radially extending vane.

3. The method of claim 1 wherein a first layer applied to said mold comprises a thermal barrier.

4. The method of claim 3 wherein a second layer comprises an oxidation barrier layer.

* * * * *